United States Patent [19]
Noodleman

[11] 3,991,331
[45] Nov. 9, 1976

[54] COMMUTATING STRUCTURE FOR DC MACHINES

[75] Inventor: Samuel Noodleman, Blacksburg, Va.

[73] Assignee: Kollmorgen Corporation, Hartford, Conn.

[22] Filed: May 9, 1975

[21] Appl. No.: 576,125

Related U.S. Application Data

[63] Continuation-in-part of Ser. No. 502,213, Aug. 30, 1974, Pat. No. 3,937,993, which is a continuation-in-part of Ser. No. 471,313, May 20, 1974, Pat. No. 3,876,892, which is a continuation-in-part of Ser. No. 383,883, July 30, 1973, Pat. No. 3,819,964.

[52] U.S. Cl. .............................. 310/46; 310/219; 310/128
[51] Int. Cl.² ........................................... H02K 37/00
[58] Field of Search .............. 310/219, 67, 46, 231, 310/232, 208, 234, 156, 235, 238, 233, 236, 128, 248

[56] References Cited
UNITED STATES PATENTS

| | | | |
|---|---|---|---|
| 2,194,211 | 3/1940 | Sanson | 310/46 |
| 2,409,600 | 10/1946 | Trautschold | 310/219 |
| 3,534,203 | 10/1970 | Sommeria | 310/231 |
| 3,544,868 | 12/1970 | Bates | 310/231 |
| 3,603,823 | 9/1971 | Mason | 310/46 |
| 3,849,682 | 11/1974 | Binns | 310/156 |
| 3,858,308 | 1/1975 | Peterson | 310/156 |

*Primary Examiner*—R. Skudy
*Attorney, Agent, or Firm*—Morgan, Finnegan, Pine, Foley & Lee

[57] ABSTRACT

A DC permanent magnet machine having stator and rotor assemblies of the "inside out" design. The stator is provided with a plurality of electrically energizable poles having windings which are electrically coupled to associated commutator bars forming an annular array. The rotor is provided with a plurality of permanent magnet poles equal in number to the poles provided in the stator. A plurality of roller contact assemblies mounted upon the rotor serve to progressively and sequentially couple the commutator bars to brush rings and through brushes to opposite polarities of a DC energizing source, thereby sequentially providing electrical power to associated coils of the stator winding. The interaction of the magnetic field created by the energized stator coils and the magnetic field of the permanent magnets in the rotor assembly causes rotation of the rotor which, in turn, rotates the roller contacts to continuously and progressively switch the DC source to succeeding stator coils. The roller contacts are arranged in an assembly which greatly enhances the dynamic stability of the rollers despite uneven wear of the rollers caused by long, continued use. The rollers are convex in shape and mate with a concave commuter bar array. The commutator bar array is kept free of dirt and/or conductive particles by the blower action created by openings in the rotating roller contacts which move air therethrough by centrifugal force. Alternatively, fan blades on the rotor may be used to create the blower action. If desired, both techniques may be used. The configuration of the commutator array protects adjacent bars against short-circuiting by conductive particles collecting therebetween.

5 Claims, 11 Drawing Figures

COMMUTATING STRUCTURE FOR DC MACHINES

This application is a continuation-in-part of my application Ser. No. 502,213 filed Aug. 30, 1974, now U.S. Pat. No. 3,937,993 which in turn is a continuation-in-part of my application Ser. No. 471,313 filed May 20, 1974, now U.S. Pat. No. 3,876,892, which in turn is a continuation-in-part of my application Ser. No. 383,883 filed July 30, 1973, now U.S. Pat. No. 3,819,964.

BACKGROUND OF THE INVENTION

Conventional DC motors typically utilize a multiple permanent magnet stator and a rotor having a plurality of energizable conductors arranged about the surface thereof and parallel to the axis of rotation. Pairs of said conductors are electrically energized by rotating commutator bars provided on the rotor, which commutator bars are electrically energized by a DC source through stationary commutator brushes which make wiping engagement with the commutator bar array. Interaction of the stator permanent magnet fields with the magnetic fields created by DC energization of the rotor conductors provides for rotation of the rotor, whereby relative rotation of the commutator bars and commutator brushes continuously changes the electrical connections between the DC source and the array of conductors in the rotor. Significant wearing of the commutator bars is caused both by the sliding friction of the brushes and the burning action of the commutating current, thereby reducing the useful operating life of the motor.

The above disadvantages, as well as the fact that conventional DC motors have high inertia, has led to the development of the "inside out" motor design in which the multipole rotor is provided with permanent magnet members and the stator is provided with an equal number of poles whose windings are energized by the DC source. This design provides a rotor with lower inertia for a given peak torque, and a stator having greater copper volume and better heat dissipation as compared with conventional DC motor designs. Thus, the "inside out" motor design has a higher continuous rating in contrast to conventional DC motors of the same size and weight.

The problem of commutation in motors of the "inside out" type have led to the development of a DC brushless type motor which employs electronic amplifiers and other solid state circuit elements to provide the necessary commutation. The electronic amplifiers and circuit elements required for proper switching of power to the stator windings to generate the rotating field add significant cost and weight to the motor. The solid state switching circuitry also increases motor "cogging" which occurs during low speed motor operation.

The numerous problems and disadvantages encountered in DC motors of both the conventional and "inside out" design have, in turn, led to the development of the design described in my U.S. Pat. No. 3,819,964 which is characterized by providing novel electromechanical switching techniques for communicating the motor windings.

In a preferred embodiment of the invention disclosed in my U.S. Pat. No. 3,819,964, the stator assembly is provided with first and second annular conductive rings connected to opposite polarities of a DC source and an annular array of commutator bars disposed proximate thereto. The rotor assembly is provided with a plurality of roller contacts which revolve with the rotation of the rotor shaft to simultaneously couple the opposite terminals of the stator coils to the opposite polarities of the DC source so as to progressively energize the stator coils, the magnetic fields of which interact with the rotating magnetic fields of the rotor permanent magnets to effect rotor rotation.

The commutating technique of the above design exemplified by my U.S. Pat. No 3,819,964 employs a "rigid" roller concept in which the roller contacts are used to bridge between the conductive rings and the commutator bars. These rollers are also mechanically tied together. In this approach, the associated rollers must operate at the same speed. Any factor which results in the production of differing roller or ring diameters or any other condition which would cause one of the rollers to operate at a different speed would impose upon its associated roller the requirement that it must slip with respect to the other. Also, if after long, continued use one of the rollers wears at a rate different from its associated roller causing its diameter to change, slippage will occur. It has also been found that a structure mechanically tying two rollers together introduces dynamic instability in that the moment of inertia of the roller assembly about an axis at right angles to the axis of rotation is quite high and any bounce or eccentricity is greatly magnified at high rotating speeds which can cause the rollers to pull away from the contacting surfaces.

In addition, dust and/or conductive particles developed by wearing of the moving parts and/or introduced from the surrounding environment may settle and collect upon the stator mounted (and hence stationary) commutator array resulting in undesirable and even harmful short-circuiting of adjacent commutator bars.

BRIEF DESCRIPTION OF THE INVENTION

In accordance with the present invention conductive rollers are provided which incorporate the dual functions of providing rolling contact with the commutator bar array and creating a blower action which serves to free the array of unwanted dust and/or conductive particles. The commutator array is designed to provide a gap between adjacent bars which allows for collection of particles while simultaneously preventing short-circuiting.

Each roller is convex and independently spring loaded against its mating concave surface and therefore can operate independently of the other thereby greatly enhancing the dynamic stability of the roller assemblies. The roller contact spring arrangement conducts current through a flexible conductor from a selected one of two independent brush rings mounted upon the rotor. Spring loaded brushes, which form part of the stator structure, wipingly engage the rotor brush rings and couple the opposite polarities of a DC source thereto.

The rollers have openings in their side walls which communicate with openings in their cylindrical surface. The centrifugal force created by rotation of the rollers during machine operation causes air to be drawn into the side openings and forced out of the openings in the cylindrical surface thereby creating a blower action to rid the commutator bar array of dust and/or conductive particles.

Either as an alternative, or in addition to the blower action provided by the rollers, the rotor may be fitted with fan blades aligned adjacent to the stator commutator array to keep the array free of foreign matter.

The commutator bars are also arranged in a "see-through" manner whereby gaps are provided between adjacent bars. The gaps narrow towards their bases wherein the sidewalls of each gap are respectively one side surface of a commutator bar and one side surface of an insulation material interposed between the above mentioned bar and the next adjacent bar to provide a region in the bottom of the gap which is free to collect dust and/or conductive particles without danger of short-circuiting the commutator bars.

The rotor may comprise a permanent magnet assembly having laminated iron pole pieces surrounded by magnetic members which enhance impedance matching, increase flux density in the air gap and resist demagnetization. In high speed DC machine applications the rotor mounted roller contacts may be of increased diameter and rollingly engage the outer peripheries of the stator mounted commutator bars.

The DC machine may be of modular design, comprising a hermetically sealed housing containing the stator windings and rotor permanent magnet assembly. A separate accessible housing then contains the commutation assembly which may be either magnetically or mechanically coupled to the rotor assembly drive shaft.

DETAILED DESCRIPTION

Figure 1:
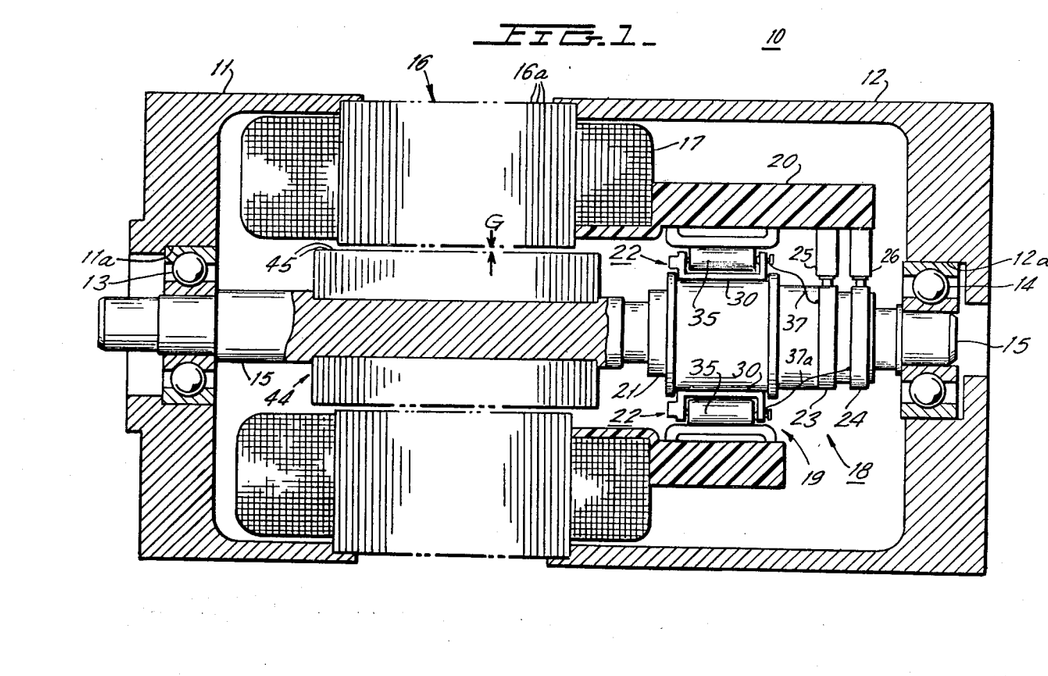
FIG. 1 is a sectional view of a DC machine of the "inside out" type which embodies the principles of the present invention.

FIG. 1 shows a preferred embodiment 10 of the invention which is comprised of housing members 11 and 12 which are each provided with openings 11a and 12a for receiving bearings 13 and 14 which surround a rotatably mounted rotor shaft 15. The inner ends of housing members 11 and 12 are hollow and are contoured or otherwise formed to receive and support the stator and rotor assemblies.

The stator assembly is comprised of a laminated core 16 formed of individual laminations 16a. The stator winding is comprised of a plurality of coils 17 (not shown in detail for purposes of simplicity) which, when energized, create magnetic fields in the stator core which interact with the magnetic fields set up in the rotor assembly to effect rotor rotation.

Figures 4, 4A, 4B:
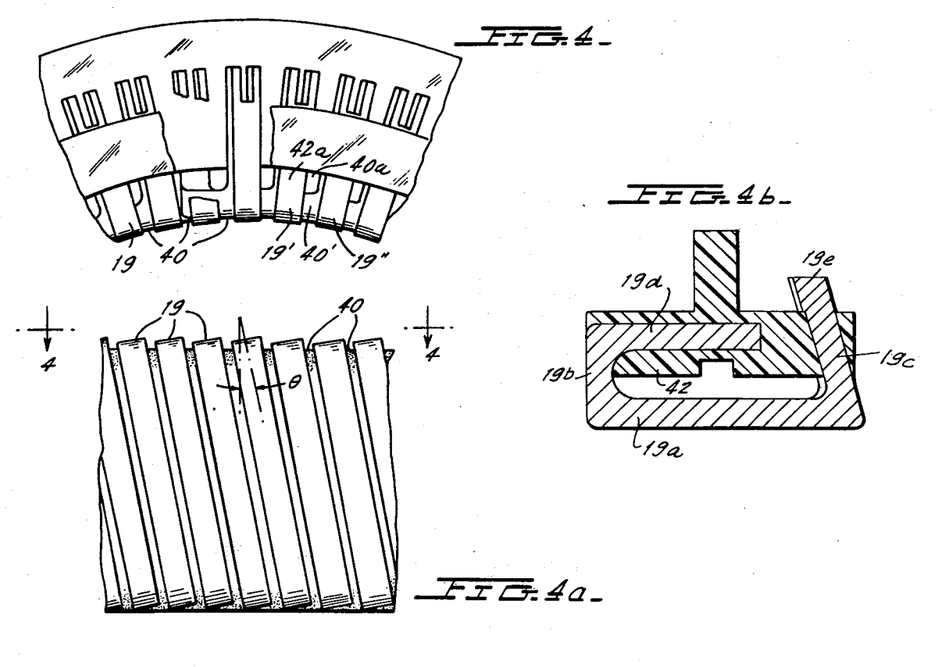
FIG. 4 is a partially sectionalized end view of a molded commutator array embodying the principles of this invention.
FIG. 4a is a partial front view of the commutator bar array of FIG. 4.
FIG. 4b shows a detailed sectional view of one bar of the commutator bar array of FIG. 4.

Housing member 12 is further adapted to receive the commutator assembly 18 which includes a plurality of commutator bars 19 mounted in radial fashion (see FIGS. 4–4b) within annular-shaped molded insulating material 42. Selected ones of the commutator bars are electrically connected to the end terminals of associated stator coils. As shown in FIG. 4a, the commutator bars 19 are skewed at a small angle $\theta$ so that a roller contact moving left to right with respect to FIG. 4a will effect a make-before-break contact with the commutator bars. In addition, skewing the commutator bars provides a smooth rolling surface for the roller contact so that it will mate smoothly with the inside surface of the commutator.

As shown in FIG. 1, the rotor assembly comprises a permanent magnet array secured to shaft 15. The outer periphery of the permanent magnet array lies a small, spaced distance from the interior periphery of the stator core 16 to form a hollow, annular-shaped air gap G therebetween.

Figure 2:
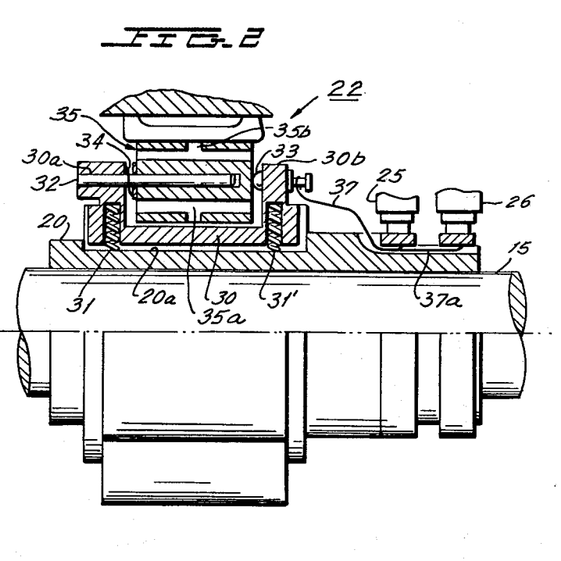
FIG. 2 is a partially sectionalized detail view of the roller contact assembly of FIG. 1.
Figure 2A:
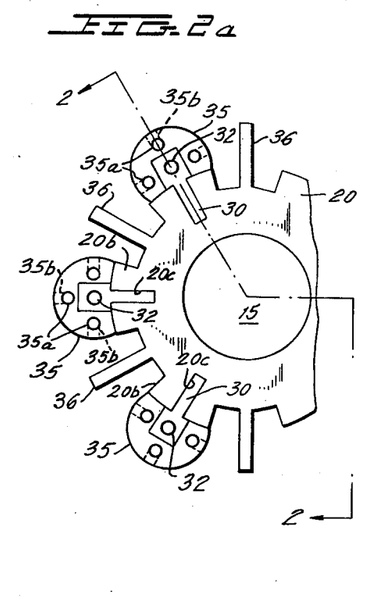
FIG. 2a is a partial end view of the roller contact assembly of FIG. 2.

Referring now to FIGS. 2–2a, the details of roller contact assemblies 22 will be explained. Unitary insulating sleeve 20 is mounted on rotor shaft 15 (see also FIG. 1) and has an annular recess 20a for positioning floating roller platform 30 which is resiliently mounted to sleeve 20 by springs 31 and 31'. Support arms 30a and 30b respectively support roller shaft 32 and contact 33. Spring 34 urges roller 35 towards contact 33. In the event of excessive wear, that portion of roller 35 bearing against contact 33 may be fitted with a plug of highly conductive, low resistance material. The arms 30a and 30b are slidably supported by the slots 20c provided in upright supports 20b arranged at spaced intervals about sleeve 20.

Conductive roller 35 is provided with hollow elongated passageways 35a parallel to the rotating axis and which extend to both sidewalls of the roller. The passageways communicate with radially aligned passageways 35b which open onto the cylindrical surface of the roller.

Fan blades 36 are molded into sleeve 20 and are interspersed between adjacent pairs of rollers.

Sleeve 20 supports continuous brush rings 23 and 24, each of which is electrically connected to selected ones of the roller assemblies 22 by flexible conductors 37, 37a. Brushes 25 and 26 are spring loaded and mounted upon the stator assembly. They engage brush rings 23 and 24 respectively. The brushes are, in turn, connected to opposite polarities of a DC power source (not shown). While depicted in FIG. 1 as disposed to one side of the roller contact assemblies 22, brush rings 23 and 24 may be positioned on opposite sides of the roller contact assemblies, if desired.

The rolling engagement between rollers 35 and the bars 19 of the commutator array rotates the rollers creating a centrifugal force which causes air to be drawn into the side openings of passageways 35a and urged out of radial passageways 35b. The rapidly moving air blows dust and/or other conductive particles away from the commutator array. Blades 36 serve the same function.

Rollers 35 of roller contact assemblies 22 progressively rollingly engage the commutator bars 19 while brushes 25 and 26 wipingly engage conductive rings 23 and 24, whereby the electrical path extends from one terminal of the DC source to brush 25, brush ring 23, flexible conductor 37, contact 33, conducting roller 35 and the commutator bars 19. The opposite polarity of the DC source is coupled to brush 26, brush ring 24, flexible conductor 37a, a roller (spaced from roller 35 of FIG. 2) and commutator bars 19. The end terminals of the stator winding are thus progressively energized and the magnetic field generated thereby interacts with the magnetic field of the rotor permanent magnet structure to sustain rotation.

The commutator bar array of FIGS. 4–4b contributes to the blower action by providing gaps 40 between adjacent bars 19. Each commutator bar has a roller contact portion 19a and upright arms 19b and 19c. Arm 19b extends inwardly at 19d to secure commutator bar 19 to insulating material 42. Terminals of the stator windings are connected to commutator bars 19 at 19e. The bars 19 are embedded in an insulating material 42 which extends partially into each gap 40 and engages one wall of each bar. For example, molded portion 40a engages one sidewall of br 19' and is spaced from the adjacent sidewall of bar 19". Particles falling into gap 40' and collecting in the bottom-most portion are prevented from creating an electrical path between bars 19' and 19" due to the presence of molded insulating portion 40a. The blower action created by fan blades 38 and/or rollers 35 keep gaps 40' clear of particles.

Figures 3, 3A:
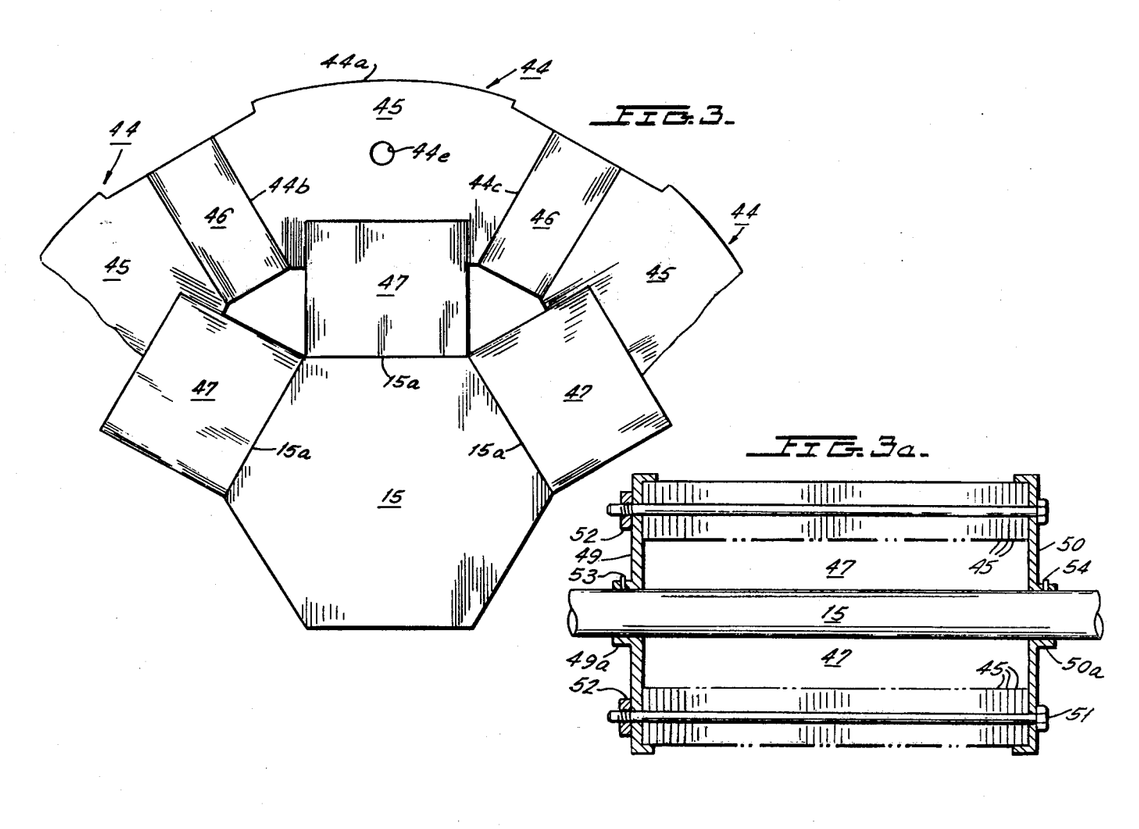
FIG. 3 is an end view of the rotor permanent magnet assembly of FIG. 1.
FIG. 3a is a side view of the permanent magnet assembly of FIGS. 1 and 3 illustrating the manner of assembly.

FIGS. 3 and 3a shows the rotor permanent magnet structure in greater detail. The permanent magnet structure comprises a plurality of laminated iron pole piece assemblies 44 each having individual pole pieces 45 (see also FIG. 1) and each having an arcuate outer periphery and radially aligned sides 44b and 44c. Each pole piece is provided with an opening 44e. The sidewalls of laminated assemblies 44 are embraced by solid rectangular-shaped permanent magnets 46.

Rotor shaft 15 has a hexagonal-shaped cross section extending the length of the permanent magnet assembly and is preferably formed of a magnetic material such as, for example, soft iron. Elongated rectangular-shaped permanent magnets 47 are positioned in pole pieces 45 and an associated surface 15a of rotor shaft 15. The magnets 46 are preferably rare-earth magnets which resist demagnetization, provide better impedance matching and serve to increase flux density across the air gap G (see FIG. 1). Magnets 47 are preferably Alnico-8 magnets. The magnet members 46, 47 and 46 embrace pole pieces 45 and serve to concentrate the flux density in the air gap G.

FIG. 3a shows the manner of assembly of the rotor permanent magnet structure. End caps 49 and 50, rods 51 and fastening nuts 52 hold the permanent magnet assembly together. Set screws 53 and 54 engage tapped openings in collar portions 49a and 50a of the end caps 49 and 50 to lock the assembly to shaft 15.

Figure 5:
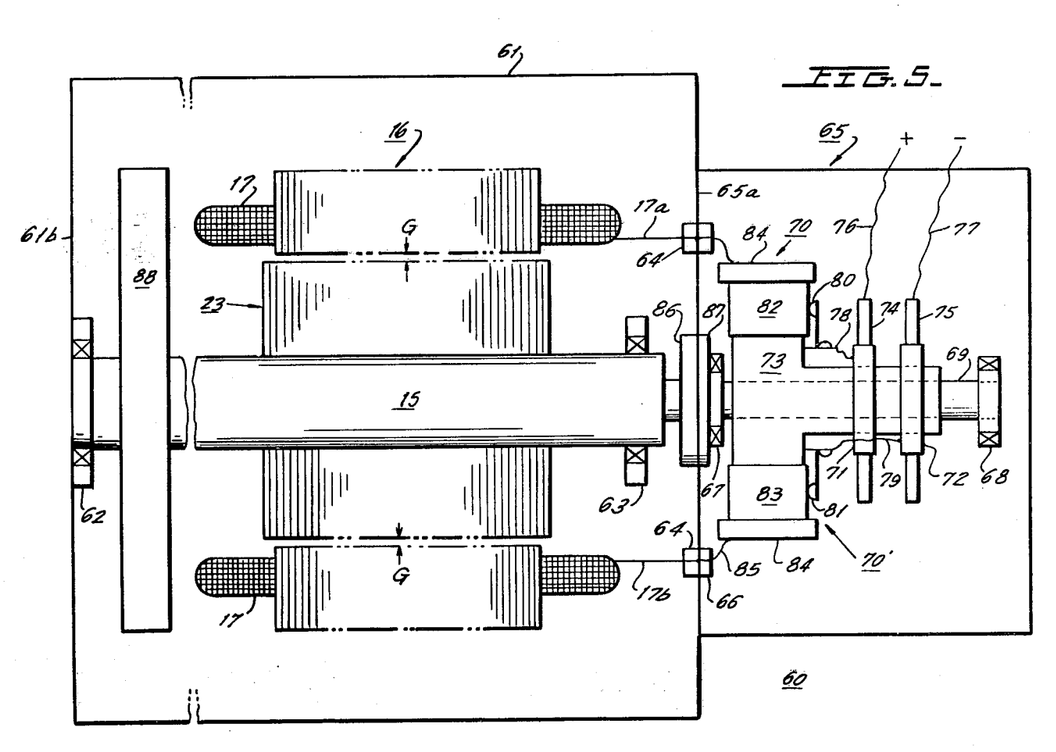
FIG. 5 is a simplified diagrammatic view of a DC machine of modular design embodying the principles of the present invention.

FIG. 5 shows a DC machine 60 of modular design comprised of a hermetically sealed housing 61 having internally mounted bearings 62 and 63 for rotatably mounting shaft 15. The permanent magnet assembly 23, which is preferably of the type shown in FIGS. 3 and 3a, is mounted upon rotor shaft 15. The stator assembly has a laminated core 16 comprised of individual laminations 16a. The stator winding is comprised of a plurality of coils 17 (not shown in detail) which, when energized, create magnetic fields in the stator core which interact with the magnetic fields set up by the rotor permanent magnet assembly to effect rotor rotation. The end terminals 17a and 17b of the stator coils are led out of the hermetically sealed housing and terminate at a hermetically sealed terminal assembly 64 moled into side face 61a of housing 61.

A second housing 65 has molded or otherwise provided along one side wall 65a a mating terminal assembly 66 which is releasably inserted into terminal assembly 64. Housing 65 is provided with bearing assemblies 67 and 68 for rotatably mounting shaft 69. Roller contact assemblies such as, for example, 70 and 70' and brush rings 71 and 72 are mounted on insulating sleeve 73 which encircles shaft 69. Stationary mounted brushes 74 and 75 are secured within housing 65 and respectively wipingly engage rings 71 and 72. Opposite polarities of a DC source are electrically connected to brushes 74 and 75 by conductors 76 and 77 which extend between brushes 74 and 75 and the exterior of housing 65. Flexible conductors 78 and 79 electrically connect brush rings 74 and 75 to spring loaded contacts 80 and 81 which engage roller contacts 82 and 83 respectively.

Roller contacts 82 and 83 are preferably of the type shown in FIGS. 2 and 3 and operate to sequentially rollingly engage stationary mounted commutator bars 84 mounted within housing 65 and which are preferably of the type shown in FIGS. 4–4b. The commutator bars are selectively coupled to the stator coils 17 through conductors 85, terminal assemblies 66 and 64 and conductors 17a–17b. A permanent magnet member 86 is secured to rotor shaft 15 and is positioned in housing 61 immediately adjacent side wall 61a. A second permanent magnet member 87 is secured to shaft 69 and is positioned in housing 65 immediately adjacent side wall 65a and adjacent to member 86.

In operation, the DC source is progressively and sequentially coupled to coils of the stator-mounted hermetically sealed housing 61 through leads 76–77, brushes 74–75, brush rings 71–72, conductors 78–79, contacts 80–81, conductive rollers 82–83, commutator bars 84, leads 85–86, terminal assemblies 66 and 64 and conductors 17a–17b. The magnetic fields created by coils 17 interact with the fields of the permanent magnet structure 23 in air gap G to effect rotation. The rotation of shaft 15 rotates magnetic member 86. The magnetic coupling between members 86 and 87 imparts rotation to shaft 69 causing the roller contact assemblies 70–70' and commutator bars 84 to progressively switch DC power to successive stator coils.

Hermetically sealed housing 61 keeps the rotor and stator assemblies, which are practically wear-free, safe from contamination by dust or dirt. Housing 65, however, is designed to be accessible for servicing. Alternatively, housing 65 may comprise a replaceable unit. While housing 61 is shown as containing the load 88 driven by rotor shaft 15, rotor shaft 15 may extend beyond the left-hand side wall 61b of housing 61 and an appropriate seal may be provided to keep the housing interior hermetically sealed. The magnetic member 86 may also be eliminated and instead rotor shaft 15 extended beyond the right-hand side wall 65a upon providing a similar seal. The magnet member 87 of shaft 69 may then be eliminated and replaced by keying means on the left-hand end of shaft 69 for locking shaft 69 to rotate with rotor shaft 15.

Figure 6:
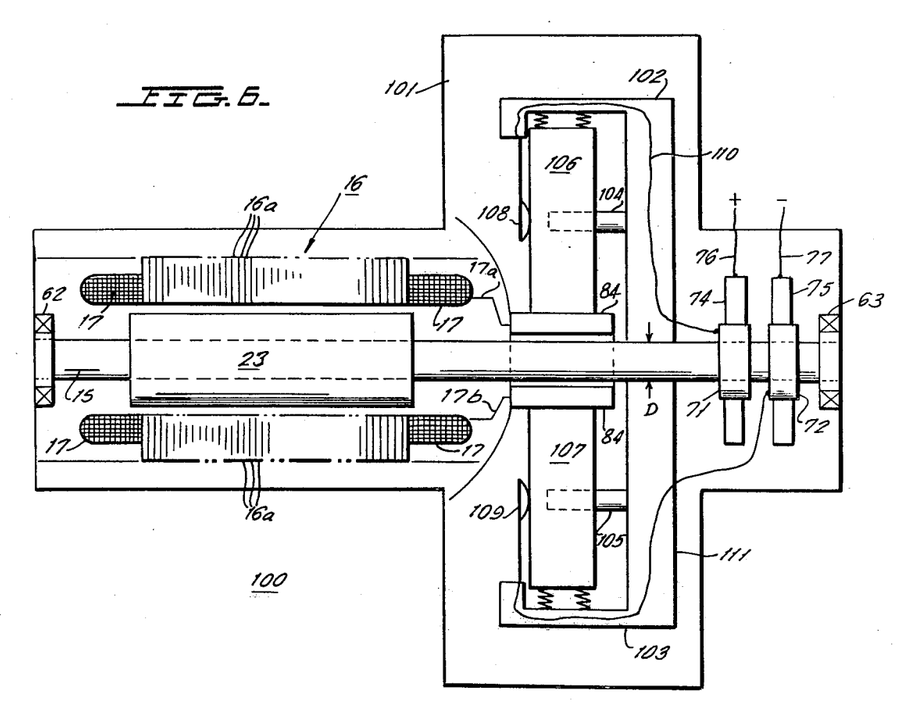
FIG. 6 is a simplified diagrammatic view of a DC machine for use in high speed operation and which embodies the principles of the present invention.

FIG. 6 shows a DC motor 100 adapted for use in high speed applications. It comprises a housing 101 which contains bearings 62 and 63 for rotor shaft 15 which has a permanent magnet assembly 23 mounted thereon. The stator comprises a laminated core 16 having individual laminations 16a. The stator coils 17 are electrically connected to selected commutator bars 84 by leads 17a–17b. A pair of brush rings 71 and 72 are mounted upon rotor shaft 15 and are respectively wipingly engaged by brushes 74 and 75. Leads 76 and 77 electrically connect brushes 74 and 75 to opposite polarities of a DC source.

Roller support assemblies 102 and 103 support roller contact shafts 104 and 105 which rotatably mount conductive rollers 106 and 107. Spring mounted contacts 108 and 109 are secured to supports 102 and 103 and electrically connect brush rings 71 and 72 to rollers 106 and 107 by conductors 110 and 111. The bars 84 of the commutator array are secured in stationary fashion and are selectively connected to end terminals of the stator coils 17 by leads 17a–17b. Conductive rollers 106 and 107, which may be of the type shown in detail in FIGS. 2 and 2a, rollingly engage the outer peripheries of commutator bars 84.

The diameter of rotor shaft 15 is made as small as practical under the commutator array while the outer diameter of conductive rollers 106 and 107 is made as large as practical. This arrangement, in one preferred embodiment, reduces the angular velocity of the conductive rollers to less than one-half the angular velocity of rotor shaft 15 thereby providing a motor design which is advantageous for use in applications requiring high speed rotation. Since the distance traveled by rollers 106 and 107 during one revolution of rotor shaft 15 is $2\pi$ times the outer diameter of the commutator bar array, then for the angular velocity of rollers 106 and 107 to be less than the angular velocity of rotor shaft 15 the diameters of rollers 106 and 107 must be greater than the outer diameter of the commutator bar array.

It has been discovered in connection with the roller commutating systems of the type disclosed in my U.S. Pat. No. 3,819,964 and in FIGS. 1, 2, 5 and 6 herein that if the longitudinal axis of the roller contact is not parallel to the longitudinal axis of the rotor then substantial forces are generated which tend to drive the roller along its longitudinal axis until slippage occurs between the roller contact and the commutator bar array. Indeed, at higher rotational speeds when the centrifugal force on the roller is greater and the roller is pressed harder against the commutator bar array the forces tending to drive the roller along its axis are increased. To overcome this difficulty a novel roller commutating system has been devised whereby both the roller and the commutator bar array are contoured in complementary fashion so as to contain the travel of the roller while ensuing continued electrical contact therebetween.

Figure 7:
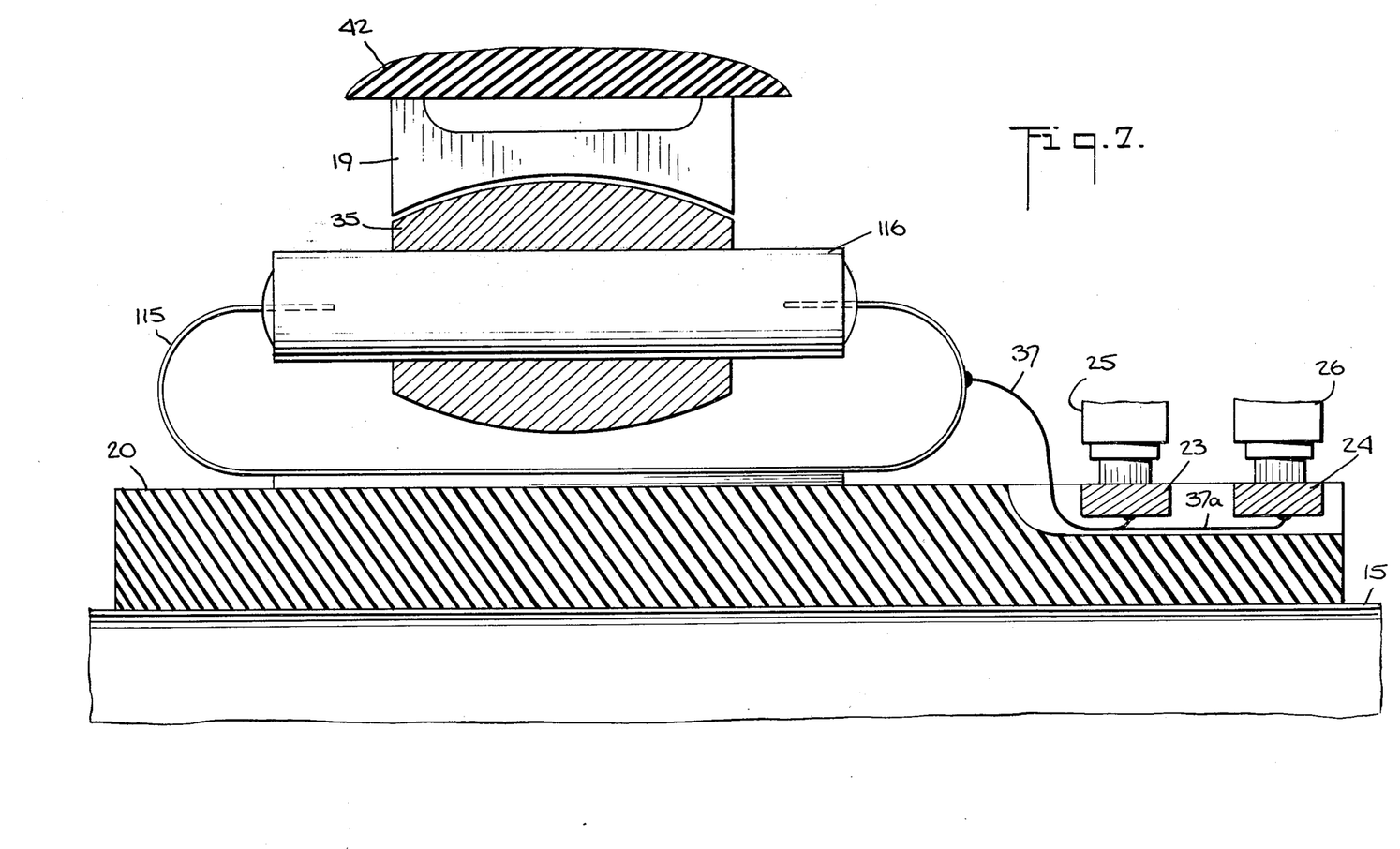
FIG. 7 is a partially sectionalized detail view of another roller contact assembly for use with the machine of FIG. 1.

This novel commutating system is illustrated in FIG. 7 wherein the same numerals designate the same parts previously described in connection with FIGS. 1, 2 and 4 Atached to sleeve 20 is a flat, conducting spring 115 which may be formed from a beryllium-copper alloy. Flexible conductor 37 connects spring 115 with brush ring 23. Attached to spring 115, e.g., by soldering, is a conducting tube 116 which also may be formed from a beryllium-copper alloy. Roller contact 35 is fitted over conducting tube 116 and is free to rotate thereon. The outer surface of roller 35 is curved and mates with the complementary curved inner surface of commutator bars 19. In this manner the roller is free to "rock" about its axis while maintaining contact with the commutator bars. Although not shown for purposes of simplicity, roller 35 has passageways for blowing dust and dirt from the commutator bars as shown in FIGS. 2 and 2a and the commutator bars 19 have the configuration shown in FIGS. 4, 4a and 4b. In addition, FIG. 7 illustrates but one of several pairs of similar roller commutating assemblies which sequentially couple opposite polarities of the DC source to pairs of commutator bars connected to the ends of indivdual windings.

The invention disclosed and claimed herein is not limited to the specific mechanism and techniques herein shown and described since modifications will ubdoubtedly occur to those skilled in the art. Hence, departures may be made from the form of the instant invention without departing from the principles thereof.

What I claim is:

1. Switching apparatus for a machine reponsive to a source of DC power and having interacting rotor and stator assemblies which rotate relative to each other wherein said stator has a winding having a plurality of energizeable coils, said coils having an annular array of commutator bars associated therewith for supplying electrical power thereto, and said rotor has a plurality of permanent magnets, said apparatus comprising:
    a. first and second annular brush rings associated with said rotor;
    b. first and second brush means associated with said stator for respectively coupling said first and second brush rings to opposite polarities of said DC source;
    c. first roller contact means associated with said rotor and electrically connected to said first brush ring for progressively and sequentially engaging said commutator bars to thereby momentarily couple said commutator bars to said first brush ring; and
    d. second roller contact means associated with said rotor and electrically connected to said second brush ring for progressively and sequentially engaging said commutator bars to thereby momentarily couple said commutator bars to said second brush ring;

said first and second roller contact means each including flexible, conductive spring means attached to said rotor and electrically connected to one of said brush rings, cylindrical conductive bearing means fixed to said spring means and disposed proximate to and substantially parallel with said rotor, and a convex roller rotatably mounted on said bearing means and adapted to mate with the concave commutator bars.

2. Switching apparatus for a machine responsive to a source of DC power and having interacting rotor and stator assemblies which rotate relative to each other wherein said stator has a winding having a plurality of energizeable coils, said coils having an annular array of commutator bars associated therewith for supplying electrical power thereto, and said rotor has a magnetic assembly associated therewith, said apparatus comprising:
    a. first and second annular brush rings associated with said rotor;
    b. first and second brush means associated with said stator for respectively coupling said first and second brush rings to opposite polarities of said DC source;

c. first roller contact means associated with said rotor and electrically connected to said first brush ring for progressively and sequentially engaging said commutator bars to thereby momentarily couple said commutator bars to one polarity of said DC source through said first brush ring; and d. second roller contact means associated with said rotor and electrically connected to said second brush ring for progressively and sequentially engaging said commutator bars to thereby momentarily couple said commutator bars to the opposite polarity of said DC source through said second brush ring, said first and second roller contact means each including a convex roller mounted to rotate about its axis and to move radially with respect to said rotor so as to engage the contoured inner surfaces of said commutator bars.

3. Switching apparatus according to claim 2 wherein said roller is provided with passageways communicating between a sidewall and the cylindrical surface thereof for blowing air upon said commutator bars.

4. Switching apparatus for a machine responsive to a source of DC power and having interacting rotor and stator assemblies which rotate relative to each other wherein said stator has a winding having a plurality of energizeable coils, said coils having an annular array of commutator bars associated therewith for supplying electrical power thereto, and said rotor has a magnetic assembly associated therewith, said apparatus comprising:

a. first and second annular conductive rings adapted respectively for coupling to opposite polarities of said DC source;

b. first roller contact means associated with said rotor and electrically connected to said first conductive ring for progressively and sequentially engaging said commutator bars to thereby momentarily couple said commutator bars to one polarity of said DC source through said first conductive ring; and c. second roller contact means associated with said rotor and electrically connected to said second conductive ring for progressively and sequentially engaging said commutator bars to thereby momentarily couple said commutator bars to the opposite polarity of said DC source through said second conductive ring, said commutator bar array having gaps between adjacent commutator bars formed by the side walls of said adjacent bars, at least one side wall in each gap having at least the lower portion thereof covered by an insulating material so as to prevent particles collecting in the bottom of said gaps from short-circuiting adjacent commutator bars, said first and second roller contact means each including a convex roller mounted to rotate about its axis and to move radially with respect to said rotor so as to engage the contoured inner surfaces of said commutator bars, said roller having passageways communicating between a sidewall and the cylindrical surface thereof for blowing air upon said commutator bars.

5. Switching apparatus for a machine responsive to a source of DC power and having interacting, hermetically sealed rotor and stator assemblies which rotate relative to each other wherein said stator is provided with a winding having a plurality of energizeable coils and said rotor has a magnetic assembly associated therewith, said apparatus positioned external to said hermetically sealed assemblies comprising:

a. an annular array of commutator bars fixed relative to said stator and electrically connected to said coils for supplying electrical power thereto;

b. first and second annular conductive rings adapted respectively for coupling to opposite polarities of said DC source;

c. first and second roller contact means fixed relative to said rotor and electrically connected respectively to said first and second conductive rings, said first and second roller contact means each including a convex roller mounted to rotate about its axis and to move radially with respect to said rotor so as to engage the contoured inner surfaces of said commutator bars, said roller having passageways communicating between a sidewall and the cylindrical surface thereof for blowing air upon said commutator bars; and d. means for coupling the relative rotation of said hermetically sealed rotor and stator assemblies to effect relative rotation between said first and second roller contact means and said commutator bars so that said first and second roller contact means progressively and sequentially engage said commutator bars to momentarily couple said commutator bars to opposite polarities of said DC sourcee through said first and second conductive rings.

* * * * *